United States Patent [19]

Taga et al.

[11] Patent Number: 4,583,815
[45] Date of Patent: Apr. 22, 1986

[54] HEAT WAVE SHIELDING LAMINATION

[75] Inventors: Yasunori Taga; Yutaka Sawada, both of Aichi, Japan

[73] Assignee: Kabushiki Kaisha Toyota Chuo Kenkyusho, Aichi, Japan

[21] Appl. No.: 509,964

[22] Filed: Jun. 30, 1983

[30] Foreign Application Priority Data

Jul. 6, 1982 [JP] Japan ................................ 57-117482

[51] Int. Cl.$^4$ ........................... G02B 5/22; H05B 3/06
[52] U.S. Cl. ..................... 350/1.6; 219/354; 219/522; 219/543
[58] Field of Search ............... 350/1.1, 1.6, 1.7, 166; 219/543, 354, 522

[56] References Cited

U.S. PATENT DOCUMENTS 4,187,336 2/1980 Gordon ........................... 350/1.6

Primary Examiner—Bruce Y. Arnold
Attorney, Agent, or Firm—Koda and Androlia

[57] ABSTRACT

A heat wave shielding lamination consisting of at least two $In_2O_3$ shield layers containing different amounts of Sn is provided on the surface of a glass substrate to provide shielding against heat waves without causing heat wave pollution in the surrounding environment. The amount of tin contained in the respective layers increases with increasing proximity to the substrate. The heat wave shielding has good transmittance to visible light and good shielding effect against rays in the infrared spectrum by virtue of the fact that the shield layers containing different amounts of Sn exhibit maximum infrared absorption at different wavelengths to give high infrared ray absorption over a wide wavelength range. It also suppresses the reflection of heat waves into the surrounding environment since each shield layer of the lamination absorbs the infrared rays reflected by Drude reflection from any shield layer containing more Sn than itself.

18 Claims, 14 Drawing Figures

HEAT WAVE SHIELDING LAMINATION

BACKGROUND OF THE INVENTION

1. Field of the Invention

This invention relates to a heat wave shielding lamination, and more particularly to an improved heat wave shielding lamination comprising a plurality of thin layers laminated on the surface of a visible light transparent substrate and possessing excellent shielding effect against heat waves, especially against infrared rays in the vicinity of the visible light range, without impairing the transparency to visible light.

2. Description of the Prior Art

Various plate materials such as those formed of glass or plastic demonstrate good transparency to visible light. However, these same materials also have good transparency to rays beyond the long-wavelength end of the visible light range (infrared rays), and because of this, there are many applications in which it becomes necessary to provide some appropriate means for coping with the energy of the heat waves passing through the plate material. An example of this is seen in the case of car windows which disadvantageously allow sunlight passing therethrough to raise the temperature of the interior of the car, thus making it necessary to equip the car with a large-capacity air conditioner. The need for a heat wave shield is by no means limited to the car window and extends widely to such sheet materials as window panes for air-planes and ships, the lenses of spectacles and cameras, glass panes for buildings and refrigerated showcases, and peephole glasses for such equipment as cooking ovens, furnaces snd welding masks.

There is known a conventional method of providing such a sheet material with a specific coating in order to prevent the passage of heat waves. One known coating material capable of providing some degree of heat shielding is ITO (Indium-Tin-Oxide, which consists of $In_2O_3$ with added Sn).

Such conventional coatings are, however, inadequate since they do not provide sufficient heat wave shielding effect and, in particular, since they have low shielding rates against near-infrared rays with wavelengths in the vicinity of 10,000 angstroms which are the rays that it is most important to shut out in shielding against the heat waves in sunlight.

As another means for shielding against heat waves it is known to provide a substrate with a coating which is transparent to visible light and reflects heat waves only. As such coatings there are known, for example, one type consisting of ITO and utilizing the Drude reflection of this substance and another type formed in a multilayer structure and utilizing the interferential reflection effect among the layers. With both of these types there is obtained relatively good reflection of heat waves and a fair degree of heat wave shielding.

The disadvantage of these conventional coatings is, however, that when they are used for high-efficiency reflection of heat waves, they give rise to a secondary problem of heat wave pollution. More specifically, when coatings of this type are used on large-area windows such as the windows of buildings or of automobiles, the heat waves reflected from the coating radiantly heat the surrounding environment thus giving rise to heat wave pollution. Because of this, the range of application of such coatings has been limited.

SUMMARY OF THE INVENTION

The object of the present invention is to provide an improved heat wave shielding lamination wherein the aforesaid infrared ray shielding layer consisting of a coating of ITO or the like is further improved so that effective heat wave shielding can be attained in the near-infrared and infrared spectrums without giving rise to heat wave pollution due to the reflection of heat waves and without loss of transmittance in the visible light range.

This object of the present invention is attained by providing a visible light transparent substrate with an overlying lamination consisting of at least two $In_2O_3$ shield layers each having Sn added thereto, the amount of Sn added to the respective layers increasing with increasing proximity to the substrate, whereby the resulting heat wave shielding lamination has good transmittance for visible light and good shielding effect against rays in the infrared spectrum by virtue of the fact that the shield layers containing different amounts of Sn manifest maximum infrared ray absorption at different wavelengths to give high infrared ray absorption over a wide wavelength range, and each shield layer absorbs the infrared rays reflected by Drude reflection from any shield layer containing more Sn than itself.

DESCRIPTION OF THE PREFERRED EMBODIMENTS

This invention provides an improved heat wave shielding lamination of the type having $In_2O_3$ shield layers laminated on a visible light transparent substrate whereby effective heat wave shielding can be attained in the near-infrared and infrared spectrums without loss of transmittance in the visible light range. Prior to explaining specific embodiments of the invention, an explanation will be given of the basic optical characteristics of the thin $In_2O_3$ layers which constitute the lamination according to this invention.

Figure 1:
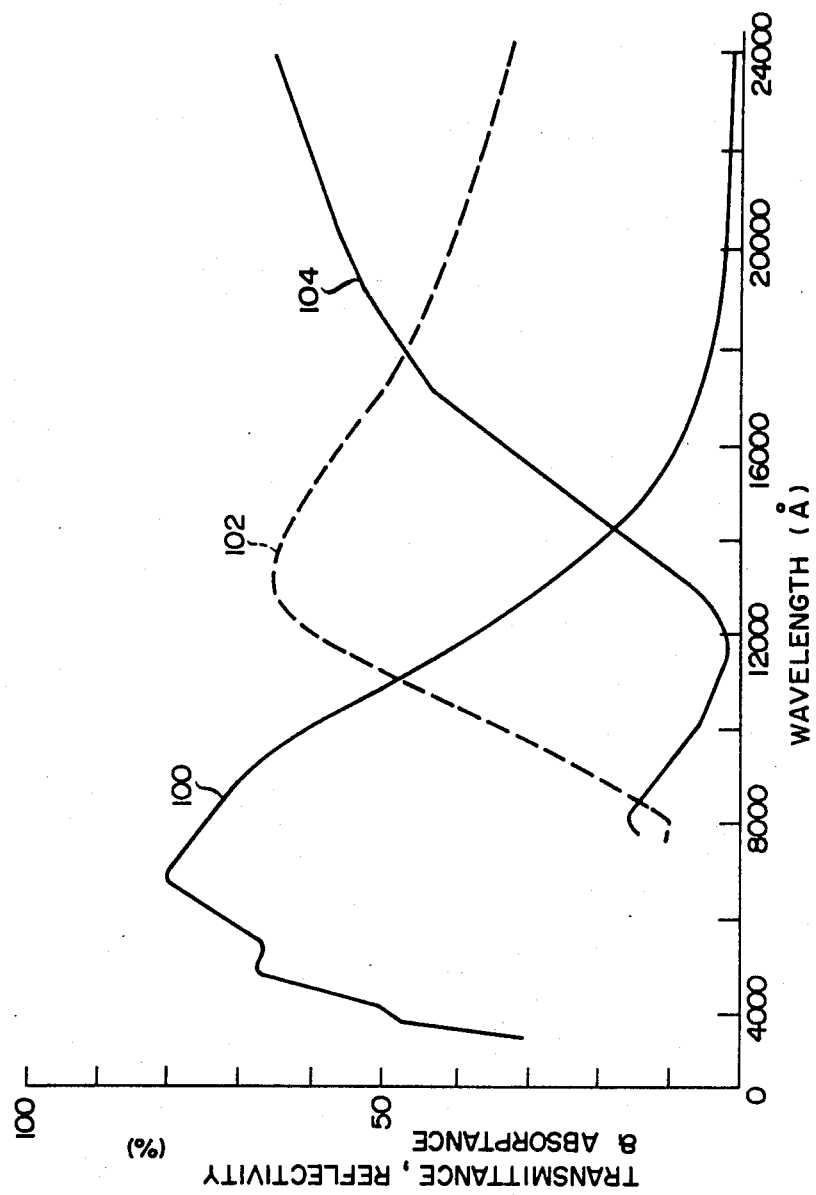
FIG. 1 is a graph showing the spectral characteristics of a thin layer of $In_2O_3$.

FIG. 1 shows the spectral characteristics of a thin ITO layer formed by adding a specific amount of Sn to a thin layer of $In_2O_3$. In this figure, the curve 100 represents transmittance, 102 absorption and 104 reflectivity.

As is clear from this figure, the thin layer of $In_2O_3$ has excellent transmittance in the visible light range (wavelengths of about 3,700–7,800 angstroms), excellent absorption in the near-infrared spectrum, and excellent reflectivity (attributable to Drude reflection) in the long-wavelength region. The spectral characteristics shown in FIG. 1 are typical for a single layer of ITO. It has, however, been quantitatively confirmed that the curves representing the absorption 102 and the reflectivity 104 can be shifted toward the short-wavelength side by increasing the effective amount of Sn additive contained in the layer within the range of 0–60% of Sn atoms, particularly within the range of 0–20% of Sn atoms.

The present invention takes advantage of this fact and is characterized by the fact that a heat wave shielding lamination is formed by providing at least two $In_2O_3$ shield layers or the like on a visible light transparent substrate in such a manner that the amount of Sn added to the respective layers increases with increasing proximity to the substrate, whereby the heat wave shielding lamination has good transmittance for visible light and good shielding effect against rays in the infrared spectrum by virtue of the fact that the shield layers containing different amounts of Sn manifest maximum infrared absorption at different wavelengths to give high infrared absorption over a wide wavelength range, and whereby each shield layer absorbs the infrared rays reflected by Drude reflection from any shield layer containing more Sn than itself.

In this way, by providing two or more shield layers containing different amounts of Sn on a substrate, the present invention makes it possible to obtain exceedingly good heat wave shielding effect without impairing transmittance for visible light.

The effects obtained by this invention will now be explained one by one.

The first shielding effect of the present invention results from the heat wave absorption that arises from the fact that each of the $In_2O_3$ shield layers laminated on the substrate has a different amount of Sn added thereto within the range of 0–60% of Sn atoms, particularly within the range of 0–20% of Sn atoms.

This effect can be understood from the fact that, as mentioned above, the absorption characteristics of a thin layer of $In_2O_3$ are changed so that the predominant region of absorption is shifted in the direction of shorter wavelength as the effective amount of Sn contained in the layer increases. Thus when, as in this invention, a plurality of $In_2O_3$ shield layers each having a different Sn content are provided on a substrate, each layer manifests maximum infrared absorption over a different range of wavelengths so that in combination the layers provide high infrared ray absorption over a wide infrared ray spectrum, whereby there is obtained a good shielding effect against infrared rays.

As in the present invention the amount of Sn added to the respective layers increases with increasing proximity to the substrate, near-infrared rays close to the visible light range are absorbed by the shield layer(s) nearer to the substrate, while infrared rays having longer wavelengths are absorbed by the shield layer(s) further from the substrate and containing less Sn.

In this arrangement, since as can be seen from FIG. 1 the thin layers of $In_2O_3$ constantly maintain excellent transmittance in the visible light range, the heat wave shielding lamination will not be degraded in transparency by the $In_2O_3$ shielding layers so that it is possible to maintain good transparency. Therefore, the heat wave shielding lamination according to this invention has good transmittance for visible light while having good shielding effect against longer wavelength rays, i.e. infrared rays, by virtue of the fact that the shield layers containing different amounts of Sn manifest maximum infrared ray absorption over different wavelength ranges so that they together provide high infrared ray absorption over a wide infrared ray spectrum, whereby there is obtained a good shielding effect through infrared ray absorption.

Thus, differently from the conventional shield layers formed of single films of ITO or $In_2O_3$ which manifest absorption characteristics only over a very narrow portion of the infrared spectrum, the heat wave shielding lamination according to this invention can, by virtue of the effect described in the foregoing, provide excellent absorption characteristics across a large region of the infrared ray spectrum. Thus, when this heat wave lamination is used on vehicle window glass, for example, it can effectively stop the passage of heat from the exterior to the interior or vice versa, meaning that it can provide a very advantageous effect either when the car is being air conditioned in the summer or when it is being heated in the winter.

The second shielding effect of the present invention results from Drude reflection. This Drude reflection occurs in each of the shield layers with respect to infrared rays in the long-wavelength range and thus contributes to the shielding against heat waves. More precisely, Drude reflection occurs at wavelengths above 12,000 angstroms and increases with increasing wavelength.

The third effect of the present invention results from the positive absorption of the infrared rays reflected by the aforesaid Drude reflection. As a result of this third effect, it is possible to positively prevent the heat wave pollution that would otherwise be caused by the reflection of heat waves.

To be more specific, since in the present invention at least two $In_2O_3$ shield layers having Sn added thereto are provided on a substrate and the amount of added Sn is greater for layers closer to the substrate, the infrared rays reflected by each of the shield layers will be absorbed by any shield layer situated upstream of itself relative to the incoming infrared rays and having a smaller Sn content. The reason for this is that the Drude reflection predominates in the long-wavelength range and shield layers containing less Sn than this have good absorption characteristics for infrared rays of this wavelength so that when, as in the present invention, the layers are formed on the substrate with the layers further from the substrate containing less Sn, the infrared rays reflected from each shield layer by Drude reflection are effectively absorbed by the layer(s) located further toward the surface side and having high absorption for the reflected wavelength. Therefore, in accordance with this invention, the infared rays reflected by Drude reflection can be efficiently and effectively absorbed so that the heat absorption of the heat wave shielding lamination is a whole is enhanced and the possibility of objects existing in the vicinity of the lamination being heated by reflected heat waves, i.e. the possibility of causing heat wave pollution is eliminated.

Although the absorption of heat waves within a lamination in this way gives rise to the problem of excessive internal temperature increase, the lamination according to the present invention is provided on the outer surface of a glass substrate or the like and, moreover, is made exceedingly thin (about 1 micron or less), it is extremely easy to cool it through heat exchange with the atmosphere (particularly where it is used on window glass for buildings or vehicles) so that in practical applications internal temperature rise causes no real problem.

Hence, the heat wave shielding lamination according to this invention is ideal for application in situations where there is a danger of heat wave pollution as, for example, in the case of large building or automobile windows.

As explained in the foregoing, in accordance with the present invention, highly effective heat wave shielding can be realized by utilizing the heat wave shielding effects of the lamination, namely heat wave absorption and Drude reflection. Moreover, as the lamination is capable of absorbing the heat waves once reflected by Drude reflection, heat absorption is enhanced and the possibility of causing heat wave pollution effectively precluded. Further, complementary to these characteristics the heat wave lamination has the major advantage of maintaining its transparency in the visible light range so that its applications are not limited to those mentioned above but extend widely to a variety of fields.

Figure 2:
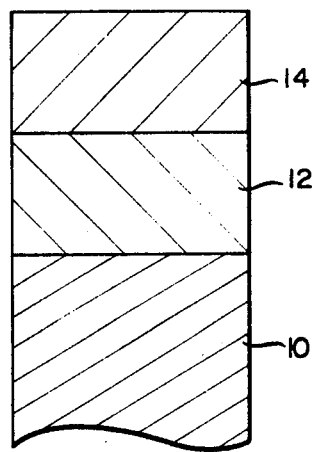
FIGS. 2 and 3 are explanatory views showing simple theoretical models of the heat wave shielding lamination according to the present invention.
Figure 3:
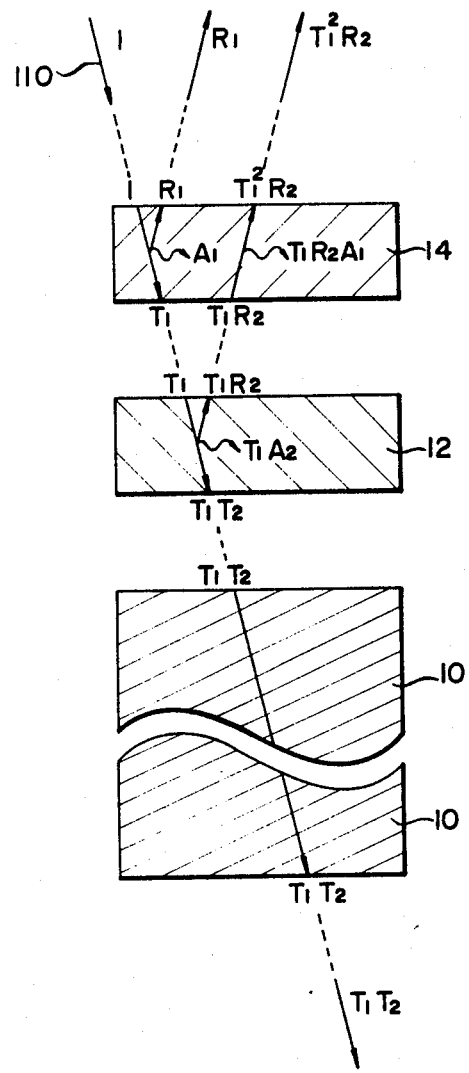

FIGS. 2 and 3 show a theoretical model of the heat wave lamination according to this invention reduced to the simplest form. As shown, the lamination consists of two $In_2O_3$ shield layers 12, 14 provided on a visible light transparent substrate 10. Both of the shield layers 12, 14 have Sn added thereto, with the amount of Sn added to the shield layer 12 situated nearer to the substrate 10 being greater than that added to the other shield layer 14.

$T_1$, $R_1$ and $A_1$ shown in FIG. 3 respectively represent the transmittance, reflectivity and absorption of the shield layer 14 at a specific infrared wavelength (these values being expressed not as percentages but as decimal numbers). The relationship among these factors can be expressed as $T_1 + R_1 + A_1 + 1$. Likewise, $T_2$, $R_2$ and $A_2$ represent the transmittance, reflectivity and absorption of the shield layer 12 and the relationship among these is $T_2 + R_2 + A_2 = 1$. The transmittance, reflectivity and absorption of the shield layers 14, 12 in combination are represented by $T_{12}$, $R_{12}$ and $A_{12}$.

Referring to the theoretical model shown in FIG. 2, a heat wave entering the lamination from the side of the shield layer 14 is transmitted, reflected and absorbed by the shield layers 14, 12 in accordance with the aforesaid transmittance, reflectivity and absorption. This transmission, reflection and absorption are shown schematically in FIG. 3 and will now be explained in more detail.

When a heat wave 110 with an intensity of 1 enters the shield layer 14 as shown in FIG. 3, it is transmitted, reflected and absorbed by the shield layer 14, in which case the amounts of transmittance, reflection and absorption are represented by $T_1$, $R_1$ and $A_1$. Next, upon transmitting through the shield layer 14 the heat wave 110 then passes into the shield layer 12 wherein it is again transmitted, reflected and absorbed. The amounts of transmittance, reflection and absorption by the shield layer 12 are represented by $T_1T_2$, $T_1R_2$ and $T_1A_2$. Moreover, the heat wave $T_1R_2$ reflected by the shield layer 12 by Drude reflection again enters the shield layer 14 to be transmitted and absorbed thereby. The amounts of transmittance and absorption of this reflected ray by the shield layer 14 are represented by $T_1^2R_2$ and $T_1R_2A_1$.

Combining the above, the total transmittance $T_{12}$, reflection $R_{12}$ and absorption $A_{12}$ by the shield layers 14, 12 can be approximated as follows:

$$\left. \begin{array}{l} T_{12} = T_1T_2 \\ R_{12} = R_1 + T_1^2R_2 \\ A_{12} = A_1 + T_1A_2 + T_1R_2A_1 \end{array} \right\} \quad (1)$$

Here the transmittance $T_{12}$, reflectivity $R_{12}$ and absorption $A_{12}$ represented as shown above involve an approximation error $\Delta$ as represented by the following formula:

$$\Delta = 1 - (T_{12} + R_{12} + A_{12}) = R_1R_2T_1 \quad (2)$$

However, in the case where the shield layers 12, 14 are each formed to a thickness of 4,000 angstroms and the incident heat wave 110 has a wavelength of 20,000 angstroms the value of $\Delta$ is only about 0.006 and can therefore be ignored.

In a structure such as that employed in the present invention wherein a plurality of shield layers 12, 14 are provided on the surface of the substrate 10, it is also necessary to consider the effect of the interfacial reflection which occurs at the interfaces between the respective layers. To determine the effect of the interfacial reflection for, say, a lamination comprised of two layers of $In_2O_3$ each formed to a thickness of 4,000 angstroms, it is sufficient to compare the total transmittance $T_{11}$, reflectivity $R_{11}$ and absorption $A_{11}$ for the two individual shield layers with the transmittance, reflectivity and absorption for an $In_2O_3$ layer of a thickness equal to the two layers combined, i.e. a thickness of 8,000 angstroms. Here, from the approximation set forth above, the transmittance $T_{11}$, reflectivity $R_{11}$ and absorption $A_{11}$ for a lamination consisting of two layers of the same thickness can be represented as follows:

$$\left. \begin{array}{l} T_{11} = T_1^2 \\ R_{11} = R_1 + T_1^2R_1 \\ A_{11} = A_1 + T_1A_1 + T_1R_1A_1 \end{array} \right\} \quad (3)$$

When the transmittance $T_{11}$, reflectivity $R_{11}$ and absorption $A_{11}$ of the lamination is derived in this way, it is found that the values obtained are almost the same as the transmittance, reflectivity and absorption of a single layer having a thickness equal to the two layers combined. Therefore, in the case of a lamination formed of a plurality of $In_2O_3$ layers as is employed in this invention, the effect of interfacial reflection can for all intents and purposes be ignored.

Next the improvement in heat absorption characteristics obtained by the present invention will be explained mathematically with reference to the theoretical models shown in FIGS. 2 and 3.

This invention is characterized by the fact that at least two $In_2O_3$ shield layers 12, 14 are laminated onto the surface of the substrate 10 and that the amount of Sn added to these layers is greater for layers nearer to the substrate 10 than for layers further therefrom. As a result, the shield layer 14 is able to absorb the infrared rays which are reflected due to Drude reflection by the shield layer 12 which has a higher Sn content than itself resulting in an increase in the overall heat absorption of the lamination.

Here the heat absorption $A_{12}$ of the theoretical model of FIGS. 2 and 3 can be expressed in accordance with formula (1) as $A_{12} = A_1 + T_1 A_2 + T_1 R_2 A_1$. On the other hand, in the case where the shield layers 12, 14 of the FIGS. 2 and 3 are formed of $In_2O_3$ to have identical Sn contents, the heat absorption $A_{11}$ can be expressed in accordance with formula (3) as $A_{11} = A_1 + T_1 A_1 + T_1 R_1 A_1$. Thus the difference in heat absorption between the two types of lamination can be found as follows:

$$\Delta A = A_{12} - A_{11} \quad (4)$$
$$= T_1(A_2 - A_1) + T_1 A_1 (R_2 - R_1)$$
$$= T_1[A_2 + A_1 (R_2 - R_1 - 1)]$$

If in this case $\Delta A$ is positive, this will mean that the improvement in heat absorption according to the lamination of the present invention has been theoretically substantiated. And, although in a practical application it is not possible to set the value of $\Delta A$ at the mathematical maximum because of the close interrelation among the transtransmittance, reflectivity and absorption, it is possible to make $\Delta A$ a large positive value within a range of heat wave wavelengths determined on the basis of practical considerations. It has been theoretically and experimentally confirmed that for setting $\Delta A$ at a large positive value it is sufficient to make $T_1$ large, $T_2$ small, $R_1$ small, $R_2$ large, $A_1$ small and $A_2$ large.

In addition to having the heat wave shielding effect described above, the lamination according to the present invention is also advantageous in that it has superior mechanical strength to the conventional coatings and in that it has good electrical conductivity. Both of these merits can be used to good effect.

In conventional arrangements wherein heat shielding has been carried out using a single layer of ITO, in order to utilize the heat wave absorption and Drude reflection of the layer it was necessary to give the layer a relatively large thickness, normally in the range of 2,000–10,000 angstroms and preferably in the range of 3,000–5,000 angstroms or even thicker. When a layer is increased in thickness to such an extent, it suffers a pronounced decrease in strength so that it is liable to break under the effect of heat stress during fabrication or later during use.

In the present invention, on the other hand, the thin lamination is made up of a plurality of layers so that it possesses adequate mechanical strength against heat stress and other forces acting thereon. What is more, as it is a multilayer structure, a break arising in any given layer can be confined to a local region and prevented from spreading throughout the lamination.

In the case of application to a car window pane, it is particularly important for the lamination to possess resistance against the abrasive action of windshield wipers and car washing machines, resistance against warping due to external mechanical forces and thermal expansion, and chemical resistance to water, sea water, strong alkaline detergents, acids and organic solvents. In the case where the thin lamination is also used as a heat wave absorption body or a heating element, the lamination will be subjected to local heating which is likely to cause stress concentration in the lamination or at the interfaces thereof and this in turn tends to promote breaking and peeling of the lamination. Also, the lamination may be subjected to thermal shocks which may occur when a rain drop or the like hits the glass when it as a high temperature. Therefore, it must possess resistance to thermal stress and shock. The multilayer structure according to this invention is fully able to meet all of these requirements.

The excellent mechanical strength of the lamination according to this invention further makes it possible to utilize the electrical conductivity of the lamination in various ways. ITO is a good electrical conductor while $In_2O_3$ is also a conductor, although not such a good one as ITO. Thus the composite lamination can be used directly as an electrical heating element for the prevention of fogging, whereby the range of application of the substrate is greatly expanded. Moreover, the individual layers are made very thin and, therefore, since they are all made of conducting materials (i.e. ITO and $In_2O_3$), a local break in one layer will not result in a total electrical discontinuity since the layer adjacent to the portion with the electrical discontinuity will constitute a detour path to the next layer. It is thus possible to realize a conductive lamination which as a whole has very low susceptibility to electrical discontinuity.

Heating of the lamination for antifogging is also advantageous in a number of other ways as it contributes to positive heating of the car interior, suppresses the exchange of interior heat via the heat of condensation at the glass surface, and helps to prevent the escape of heat by reducing the slope of the temperature gradient in the vicinity of the glass surface. Moreover, the heating effect of the lamination makes it possible to attain uniform heating without giving much attention to the circulation of the air within the car. The contribution of this type of lamination to the heating of the car interior will be especially great in the new types of high fuel efficiency cars, such as the ceramic engine car, that have been appearing in recent years since in these it is difficult to obtain heat for warming the car interior from the system for cooling the engine.

The conductivity of the lamination can be utilized not only to provide a heating effect but also in a number of other ways. For example, a dew sensor can be formed by using the lamination as an electrode for measuring the electrical resistance at the surface of the glass. It is also possible to employ the lamination as a sensor for determining the temperature of the glass surface.

As explained in the foregoing, the lamination in accordance with the present invention is provided on the surface of a visible light transparent substrate and manifests the superior effects enumerated above. Here it should be noted that the substrate on which the lamination of this invention is formed is not limited to glass but may be another material such as visible light transparent plastic or film. Moreover, the surface of the substrate need not necessarily be smooth.

The formation of the lamination of the present invention on the surface of the substrate can be carried out by a physical method such as vacuum evaporation, sputtering or ion plating, by a chemical method such as the liquid dipping method, the spray-thermal decomposition method, or by a combination of these.

This invention will now be described in detail with respect to specific embodiments.

EXAMPLE 1

The first embodiment of this invention which will now be explained was realized by reducing to concrete form the theoretical model shown in FIGS. 2 and 3. Transparent glass is used for the substrate 10, the shield layer 12 is a thin layer of ITO containing 20% of SN atoms (meaning that the ratio between the number of In atoms and the number of Sn atoms is 80 to 20), and the shield layer 14 is a thin layer of ITO having a Sn content of zero (which is to say that it is a thin layer of $In_2O_3$). Both the shield layers 12, 14 in this embodiment contain a small amount of oxygen vacancies.

On the basis of tests conducted to determine the shield layer thickness required for adequate mechanical strength, the shield layers 12, 14 were each made to a thickness of 4,000 angstroms, the upper limit for a thin film of either $In_2O_3$ or ITO.

Figure 4:
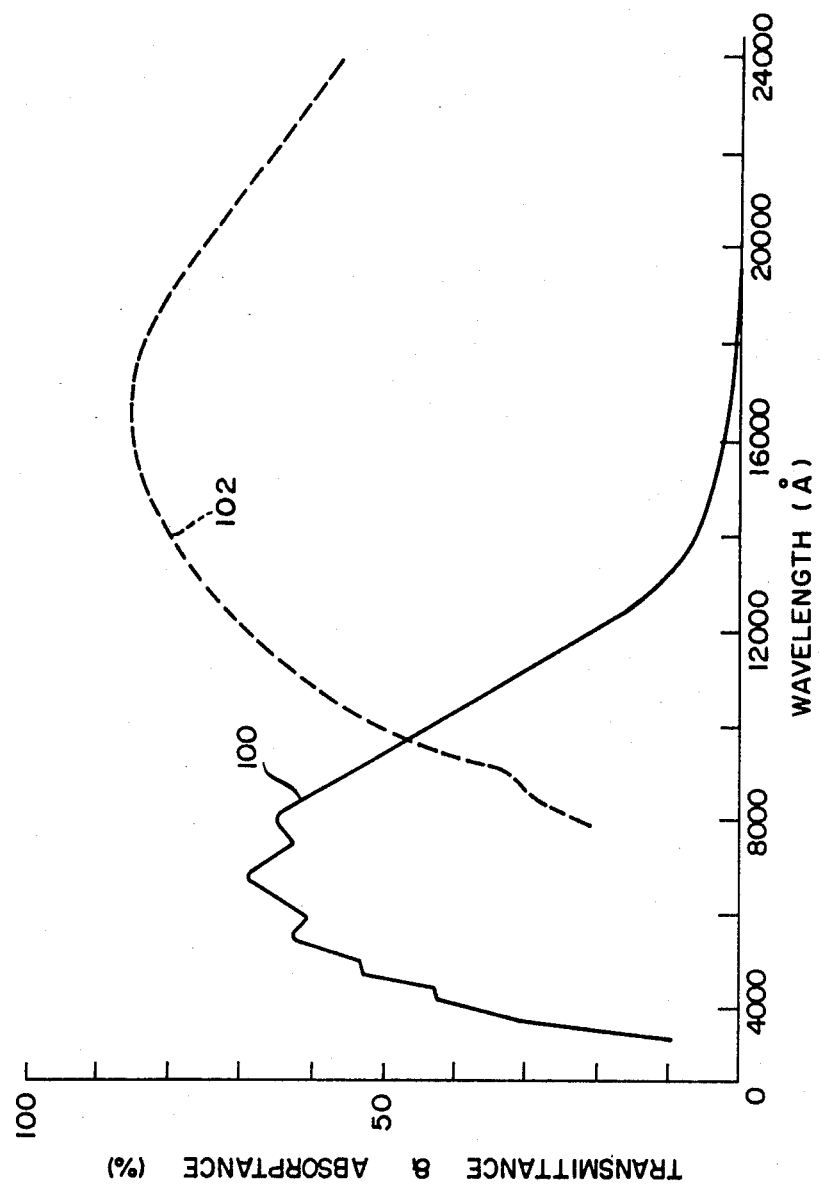
FIG. 4 is a graph showing the spectral characteristics of a first embodiment of the present invention.

The spectral characteristics of this first embodiment are shown in FIG. 4, from which it will be seen that the lamination has excellent transmittance in the visible light range and excellent absorption over a wide region of the infrared spectrum.

As shown in this figure, the transmittance of the lamination of this embodiment in the visible light range (wavelengths in the range of about 3,700-7,800 angstroms) is very good, giving it adequate transparency for use with car windows, which require a high level of transmittance. Moreover, on the basis of experiments and experience, the lamination is found to provide adequate visibility for safe riving. The small irregularities that will be noted in the transmittance 100 in the visible light range are the result of the transmittance characteristics corresponding to the interferential reflection of a single layer having a refractive index of 2 and thickness of about 8,000 angstroms (the combined thickness of the of the shield layers 12 and 14) and the interferential reflection of the substrate. In actual application, almost no interference coloring can be noted in the pane and the color appears to be slightly brown. There is thus no problem in applying the pane as the window glass for an automobile.

Moreover, by constituting the shield layer 12 of a thin ITO film having a relatively large Sn content as in this invention, there is gained the effect of positively suppressing the occurrence of transmittance colors and reflection colors caused by interference. For example, when a white object is viewed through the lamination, the light absorption characteristics of the lamination tend to soften the appearance of the object and decrease interference coloration. Thus when the lamination is used on the windows of an automobile, it has the effect of protecting the driver's eyes from the strong light outside the car.

As also clear from the spectral characteristics shown in FIG. 4, the lamination according to this embodiment demonstrates high absorption exceeding 50% and reaching a maximum of over 80% across a wide wavelength band extending over about 10,000-26,000 angstroms, whereby it is able to provide outstanding heat wave shielding effect while at the same time positively precluding the occurrence of so-called heat wave pollution. This is because the ITO shield layer 12 having a high Sn content has high heat absorption characteristics in the near-infrared spectrum (wavelengths in the range of about 10,000 to about 15,000 angstroms) neighboring the visible light range and the $In_2O_3$ shield layer 14 having no added Sn has high heat absorption characteristics in the longer wave infrared spectrum. Thus, since the shield layers 12, 14 have high absorption characteristics in different wavelength spectrums, the multilayered lamination as a whole manifests excellent heat absorption characteristics over a wide infrared spectrum extending over the range of about 10,000-26,000 angstroms.

Another reason for the excellent heat wave absorption which the lamination according to this embodiment manifests over a wide sector of the infrared spectrum as shown in FIG. 4, is that the heat waves reflected from the shield layer 12 by Drude reflection are absorbed by the shield layer 14. More precisely, as is also clear from the reflectivity 104 in FIG. 1, the Drude reflection of the shield layer 12 is set so as to become predominant from wavelengths of about 16,000 angstroms so that when, as in the present invention, the shield layer 14 which absorbs the heat waves reflected by Drude reflection is formed of a thin $In_2O_3$ layer having excellent absorption characteristics in the long wavelength range of 15,000-26,000 angstroms, the reflected heat waves can be absorbed with very high efficiency. Thus, the lamination according to this embodiment is able to provide excellent heat wave absorption over a wide range of navelengths as shown in FIG. 4.

Therefore, as the lamination in accordion with this embodiment possesses excellent heat absorption characteristics over a very wide region of the infrared spectrum while still maintaining its transmittance in the visible light range, it provides outstanding heat shielding effect while at the same time positively suppressing heat wave pollution from reflected heat waves.

Moreover, since the respective shield layers 12, 14 are formed to the same thickness, they are capable of evenly distributing any stress arising therein. As a result, the lamination according to this embodiment has superb mechanical strength.

Another feature of the lamination according to this first embodiment is that it has an electrical resistance of 8.9$\Omega$/sq., which is the equivalent of $7.1 \times 10^{-4}\Omega\cdot cm$ for a single layer having a uniform thickness of 8,000 angstroms, a value which is fully adequate for use of the lamination as the heating element for a demister or defroster on a vehicle window. Moreover, in a test to confirm the usefulness of the lamination in such an application, it was found that it suffered no stress cracking or peeling even when it was subjected to rapid heating by the application of a large current through the heating element.

Thanks to its electrical conductivity, the lamination according to the first embodiment can thus be employed as a planar heating element which, when uniformly heated, can produce an effective antifogging or antifrosting effect on the surface of a car window pane. A planar heating element of this type causes little thermal stress to develop in the glass even under rapid heating so that it has the advantage of being unlikely to cause cracking or other types of damage.

Table 1 shows a comparison of the spectral characteristics of the lamination according to this embodiment and those of single layer coatings with respect to infrared radiation at the wavelength of 18,000 angstroms. As can be seen from the data in this table, the lamination according to this invention demonstrates higher heat wave absorption than does a single layer of $In_2O_3$ or a single layer of ITO. (For practical purposes, the value of 0.02 for the transmittance $T_{12}$ of the lamination of this embodiment can be considered substantially zero.)

TABLE 1

|  | First embodiment | In$_2$O$_3$ Single layer | ITO Single layer |
|---|---|---|---|
| Coating Structure | In$_2$O$_3$ (4000Å) ITO (Sn: 20% of atoms, 4000Å) | In$_2$O$_3$ (8000Å) | ITO (Sn: 20% of atoms, 8000Å) |
| Transmittance T | $T_{12} = 0.02$ | $T_{11} = 0.24$ | $T_{22} = 0.00$ |
| Reflectivity R | $R_{12} = 0.15$ | $R_{11} = 0.04$ | $R_{22} = 0.43$ |
| Absorption A | $A_{12} = 0.84$ | $A_{11} = 0.74$ | $A_{22} = 0.55$ |

EXAMPLE 2

Figure 5:
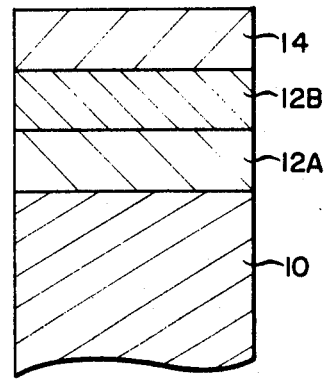
FIG. 5 is an explanatory view showing the structure of a second embodiment of the invention.

A second embodiment of the lamination of this invention is shown in FIG. 5. In this embodiment borosilicate glass is used for the substrate 10 and the lamination formed on this substrate consists of two ITO shield layers 12A, 12B overlaid with a third shield layer 14 formed of In$_2$O$_3$ and containing no Sn. All three shield layers 12A, 12B and 14 are formed to a thickness of 1,000 angstroms. The ITO shield layer 12B contains 2.7% of Sn atoms and the ITO shield layer 12A 10.0% of Sn atoms. Therefore, each of the shield layers 12A, 12B and 14 of the lamination according to this embodiment manifests good absorption in a different region of the infrared spectrum so that together they cooperate to provide good absorptance characteristics over a wide range of infrared radiation wavelengths.

Figure 6:
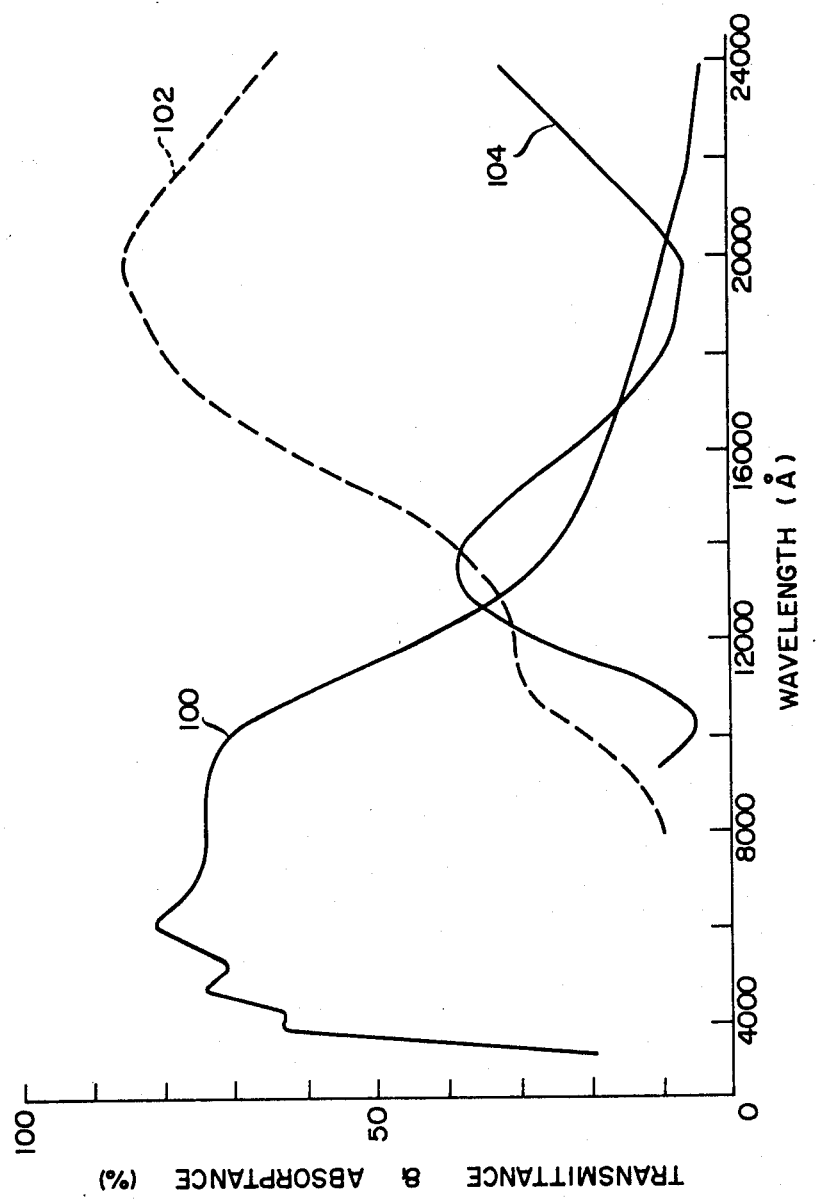
FIG. 6 is a graph showing the spectral characteristics of the second embodiment shown in FIG. 5.

The spectral characteristics of this second embodiment are shown in FIG. 6, wherein 100 represents transmittance, 102 absorption and 104 reflectivity. From these spectral characteristics it can be seen that the transmittance 100 of the lamination according to this embodiment is exceptionally high (averaging about 75%) in the visible light range (wavelengths in the range of about 3,700 to 7,800 angstroms). This value is more than adequate to meet the minimum 70% transmittance requirement for car window glass. Moreover, on the basis of experiments and experience, the lamination was found to provide adequate visibility for safe driving. The small irregularities that will be noted in the transmittance curve in the visible light range are the result of the transmittance characteristics corresponding to the interferential reflection of a single layer having a refractive index of 2 and a thickness of about 3,000 angstroms (the combined thickness of the three layers). In actual application, almost no interference coloring could be noted in the pane and the color appeared to be neutral gray or very slightly brown. There was thus no problem in applying the pane as the window glass for an automobile.

An examination of the spectral characteristics shown in FIG. 6 shows that by providing maximum absorption in different regions of the infrared radiation spectrum the shield layers 12A, 12B and 14 cooperate to provide very good heat absorption (50% and higher) across a wide part of the infrared spectrum (between wavelengths of about 15,000–30,000 angstroms). As a consequence the lamination is able to provide excellent shielding against heat waves.

It will also be noted from FIG. 6 that in this second embodiment, the reflectivity 104 once peaks in the region of 12,000–16,000 angstroms and then climbs sharply from a wavelength of around 20,000 angstroms. This peak which the reflectivity shows in the 12,000–16,000 angstrom region has been intentionally provided in view of the wavelength distribution of solar energy so as to obtain particularly effective reflection of heat waves in this region. It is primarily the result of Drude reflection by the ITO shield layers 12A and 12B.

As the lamination in accordance with this embodiment has comparatively large reflectivity compared with the lamination of the first embodiment, the heat waves reflected therefrom will have a greater effect on the surrounding environment than those reflected from the lamination of the first embodiment. Therefore, its use must be limited to applications in which a certain amount of heat wave reflection can be tolerated.

Thanks to the very excellent absorption characteristics and reflection characteristics it possesses, the lamination according to this embodiment provides a very large shielding effect with respect to heat waves. Therefore, in the case where the lamination according to this embodiment is used in conjunction with vehicle window glass or the like, it is able to provide shielding against secondary radiation from the road surface which is of longer wavelength than the rays of sunlight directly striking the car. Because of this it can help to mitigate the temperature rise within the car and to reduce the load on the car's air conditioning system. Moreover, since the heat wave shielding lamination not only prevents outside heat from entering the car but also prevents heat within the car from escaping to the exterior, it is able to effectively prevent heat radiation from the car during the cold season, particularly on winter nights, and can therefore help to prevent the temperature within the car from falling and to reduce the load on the car's heating system. This is because the radiant heat from the car interior is radiated by bodies at between about body temperature and room temperature and is therefore in the form of very long wavelength infrared rays. Therefore, since the lamination according to this embodiment has very high reflectivity for long-wavelength infrared radiation, it is able to reflect this long-wavelength radiant heat back into the passenger cabin, thus reducing the rate of temperature drop within the car such as when it is parked outside for a long time during cold weather and reducing the load on the car's heating system. Moreover, as a side effect of this heat preservation effect, the lamination also helps to prevent fogging and frosting of the vehicle windows.

Also, as the electrical resistance of the lamination according to this second embodiment is 9.8Ω/sq., which works out to $5.9 \times 10^{-4}$ Ω·cm for a single layer with a uniform thickness of 6,000 angstroms, it is fully adequate for use as the heating element for a demister or defroster on a vehicle window. In this connection, it is also obvious that the lamination can be used with an infrared ray heater. In such case, however, it is necessary to properly adjust the absorption of the lamination in consideration of the main wavelength of infrared heater.

The lamination of the second embodiment was formed using the DC magnetron sputtering method to sequentially laminate the layers on the substrate. More specifically, the temperature of the substrate was raised to 370° C. and the surrounding atmosphere was evacuated to create a high vacuum of a pressure lower than $4 \times 10^{-6}$ Torr, whereafter argon was introduced to raise the pressure to $3 \times 10^{-3}$ Torr and the layers were formed by sputtering in the resulting atmosphere. In this sputtering operation, the ITO shield layer 12A was formed first, followed by the ITO shield layer 12B and finally the In$_2$O$_3$ shield layer 14.

EXAMPLE 3

Figure 7:
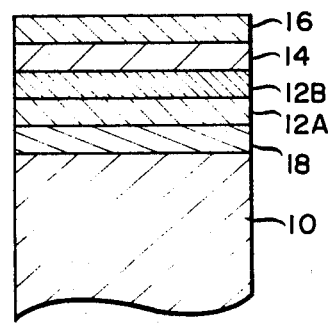
FIG. 7 is an explanatory view showing a third embodiment of the heat wave shielding lamination according to this invention.

A third embodiment of the invention is shown in FIG. 7. In this embodiment a lamination the same as that of the second embodiment is provided with an anti-reflection layer 16 on its outer surface and with an undercoating 18 between the substrate 10 and the shield layer 12A.

The anti-reflection layer 16 and undercoating 18 consist of $SiO_2$ having a refractive index $n_c$ of approximately 1.43, a value which is approximately equal to the square root of the refractive index (2) of the ITO and $In_2O_3$ shield layers in the visible light range. The thickness $d_c$ of the anti-reflection layer is selected as:

$$d_c = \frac{\lambda}{4n_c} \quad (5)$$

where $\lambda$ is a typical wavelength in the visible light range. In the embodiment the value of $\lambda$ is taken as 5,000 angstroms, meaning that the thickness of the $SiO_2$ constituting the anti-reflection layer 16 and the undercoating 18 was set at 874 angstroms. On the other hand, the shield layers 12A, 12B and 14 were each formed to approximately the same thickness as the anti-reflection layer 16 and the undercoating 18.

In this embodiment, as a result of the formation on the outer surface of the lamination of a $SiO_2$ layer, i.e. of the anti-reflection layer 16, the lamination is improved by about 10% in its transmittance while suffering no degradation in its characteristics in the infrared spectrum. The main reason for this improvement in transmittance to visible light is that the anti-reflection layer 16 prevents interferential reflection in the visible light range, which is to say that it prevents the interferential reflection of a coating layer constituted by the ITO and $In_2O_3$ layers in combination. In the case of a layer thickness which is about equal to or larger than the wavelength in the visible light range, the effect is the same as that obtained by providing, as the first approximation, an anti-reflection layer (with a refractive index of about $\sqrt{2}$ and a layer thickness of $\lambda/4\sqrt{2}$) on a material of infinite thickness having a refractive index of 2. By the use of a computer or the like it is of course possible to calculate the optimum layer thickness even more precisely.

The $SiO_2$ used for this anti-reflection layer is very strong both mechanically and chemically and is therefore also useful as a protective coating for the lamination. When used in conjunction with a lamination for a car window pane it has the effect of greatly extending the lamination service life. As $SiO_2$ also has a proper degree of affinity for water, it will improve visibility through the car window during rainy weather. Moreover, the electrical insulation property of $SiO_2$ will help to prevent current leakage and also to protect the ITO and $In_2O_3$ from degradation by electrochemical reaction.

The undercoating 18 provided on the surface of the substrate 10 in the lamination of this embodiment is a layer of $SiO_2$. As such an $SiO_2$ layer normally has approximately the same optical characteristics as glass, its provision on the glass substrate has no optical effect whatsoever. The undercoating 18 does, however, function to protect the ITO shield layers 12A and 12B and the $In_2O_3$ shield layer 14 from degradation of their electrical and optical properties by preventing alkali ions from dispersing inton these layers from the glass substrate 10.

In the present embodiment, since borosilicate glass is used for the substrate 10 and, as will be explained later, the substrate is kept at a relatively low temperature of 370° C. during sputtering, there is no danger of alkali ions invading into the shield layers. If, however, a glass substrate containing alkali ions such as soda lime glass should be used for the substrate 10 and the $In_2O_3$ and/or ITO layers should be formed under high temperature conditions using, for example, the spray-thermal decomposition method, alkali ions (valence of 1 or 2) would invade into the $In_2O_3$ and/or ITO layers and cause degradation of their electrical and optical properties. If as in the present embodiment, however, the surface of the substrate 10 is provided with the protective undercoating 18 constituted of $SiO_2$, the invasion of alkali ions can be prevented and the service life of the shield layers 12, 14 greatly extended. As the undercoating also prevents the invasion of alkali ions at the time of manufacture of the lamination, its provision permits greater freedom in carrying out the manufacturing process.

Another merit of this embodiment is that since the shield layers are all formed to the same thickness, the thickness of the individual layers is smaller and stress arising in the layers is destributed more uniformly so that the lamination has better mechanical strength.

As in the second embodiment, the formation of the lamination according to this third embodiment is conducted by the sputtering method with the $SiO_2$ layers being formed by high-frequency sputtering. In the course of sputter formation the $In_2O_3$ and ITO layers come to include a small amount of oxygen vacancies, with the result that they possess oxygen deficiency-induced free electrons. The sputtering of the ITO layers is carried out in an argon atmosphere (without introduction of oxygen) out of consideration for the amount and distribution of the oxygen vacancies and of the Sn atoms. In this way, it is possible to control the electrical resistivity and the heat wave absorption and reflection wavelengths of the ITO layers to the desired values.

The aforesaid sputtering operation is preferably carried out with the substrate 10 at a temperature between 200°–650° C., more preferably between 300°–450° C. This is because even though the properties of the ITO layer improve with increasing temperature of the substrate, the rate of improvement is somewhat slower at temperature over 300° C. and also because use of higher temperatures entails the dangers of (1) the tempered glass substrate being degraded in strength, (2) alkali ions from the substrate 10 invading into the ITO layer 12A, and (3) the ITO crystals growing excessively, making it impossible to form a layer with uniform thickness. In view of these considerations, the substrate temperature was set at 370° C. during the sputtering operation in this embodiment.

Moreover, in this embodiment, the switch-over time between the sputter-formation of consecutive layers was reduced to substantially zero, whereby the introduction of foreign matter at the interfaces was avoided to the greatest degree possible so as to improve the mechanical strength at the interfaces between the sputter-formed layers, suppress ion diffusion at the interfaces, improve electrical and optical compatibility at the interfaces, improve thermal conductivity at the interfaces, and in general to upgrade the interfacial properties of the lamination.

In order to improve the adherence of the sputter-formed layers to the glass substrate 10, the substrate was meticuously cleaned by chemical and physical methods prior to the sputtering operation.

In order to upgrade the quality of the layers formed by sputtering it is necessary to control the oxygen activity during sputtering and for this it is especially effective to control the partial oxygen pressure and to employ various other modes of activation. Therefore, as measures that can be readily carried out as required following sputter formation of the layers there can be mentioned heat treatment for oxidation or reduction and crystallization.

In this embodiment, the thickness of the individual layers is determined in accordance with equation (5). However, it should be noted that this method of determination is based on light rays striking the lamination perpendicularly so that in a case where the lamination is designed on the basis of obliquely impinging light rays, the thicknesses of the respective layers are not restricted to those determined by equation (5).

It is also possible to use layer thicknesses differing from those of the present embodiment in cases where it is necessary to do so in order to provide the layers with the required durability.

EXAMPLE 4

Figure 8:
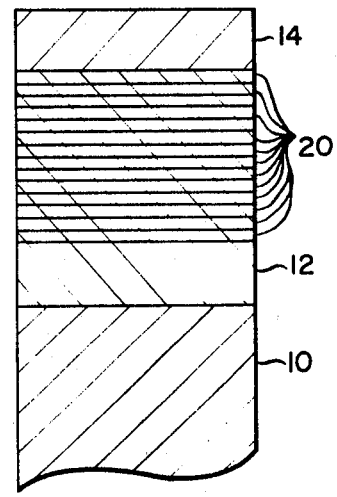
FIG. 8 is an explanatory view showing a fourth embodiment of the heat wave shielding lamination according to this invention.

A fourth embodiment of the invention is shown in FIG. 8. In this embodiment one of the ITO shield layers provided on the substrate is constituted of a plurality of laminated ITO films which vary in Sn content in such manner that the closer a film is to the substrate, the higher is its Sn content. This arrangement provides good absorption characteristics over a wide region of the infrared spectrum and also provides good absorption of heat waves once reflected by Drude reflection.

That is to say, in the lamination of this embodiment, there is provided on the substrate 10 an ITO shield layer 12 having an Sn content of 10% of Sn atoms and a thickness of 2,000 angstroms. On top of this ITO layer 12 there is provided an ITO shield layer 20 which is constituted of 14 laminated films each having a thickness of 400 angstroms. And finally, on top of the ITO shield layer 20 is provided an In$_2$O$_3$ shield layer 14 having a thickness of 2,000 angstroms. In this arrangement, the amounts of tin contained in the ITO films constituting the ITO shield layer 20 are, beginning from the topmost film adjacent to the In$_2$O$_3$ shield layer 14, made to the 1.0, 1.5, 2.0, 2.5, 3.0, 3.5, 4.0, 4.5, 5.0, 5.5, 6.0, 7.0, 8.0 and 9.0% of Sn atoms.

Figure 9:
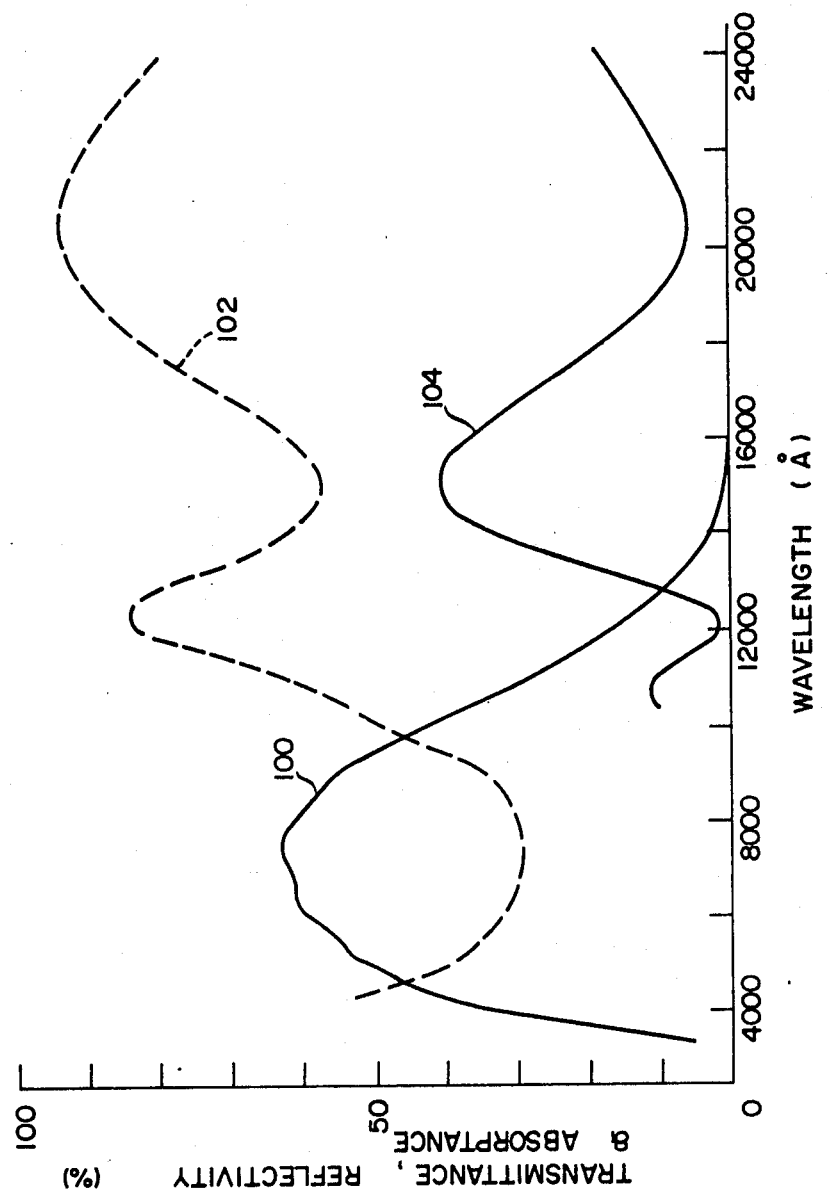
FIG. 9 is a graph showing the spectral characteristics of the fourth embodiment shown in FIG. 8.

The spectral characteristics of the lamination according to this embodiment are shown in FIG. 9. As will be understood from the curve 102 shown in this figure, the lamination of this embodiment has very high absorption. In particular, it will be noted that since the lamination of this embodiment has relatively high absorption in the visible light range, the transmittance 100 in the visible light range averages about 60%. In fact, however, a reduction in transmittance of this degree leads to almost no degradation in discernibility when viewing through the glass and the only difference noticed by the viewer is that objects appear to have a slightly black or brown tint. This hue is generally referred to as bronze or brown, and aside from having a highly pleasing aesthetic effect it also has a softening effect on strong exterior light.

As can be seen from the spectral characteristics shown in FIG. 9, particularly from the transmittance 100, the heat shielding effect of the present embodiment is such that over 50% of the heat waves are shut out at wavelengths of the infrared spectrum exceeding 9,500 angstroms, with the shielding effect reaching substantially 100% at wavelengths of the infrared spectrum beyond about 16,000 angstroms. This effect can be attributed to the fact that the lamination of the present invention comprises the shield layer 20 consisting of 14 films of ITO each containing a different amount of Sn. The result is that, as shown by the spectral characteristics in FIG. 9, the absorption 102 of the lamination is very high over a very wide range of wavelengths, while the reflectivity is also very good. A particular feature of this embodiment is that the ITO shield layer 12 containing 10% of Sn atoms which is provided on the glass substrate 10 is made thicker than the individual films constituting the ITO shield layer 20 so that the lamination exhibits strong heat wave absorption in the short-wavelength range below about 14,000 angstroms and strong heat wave reflection in the wavelength range of about 13,000–17,000 angstroms. Also, as the ITO shield layer 20 is formed as a multilayer structure constituted of a plurality of ITO films each having different Sn content, the overall heat wave absorption is strengthened, with particularly high heat wave absorption being obtained in the long-wavelength range from 18,000 angstroms and upward. Moreover, as in the lamination according to this embodiment the thickness of the In$_2$O$_3$ shield layer 14 provided on the outermost surface (2,000 angstroms) is made greater than that of the individual films making up the ITO shield layer 20 (400 angstroms), the heat wave absorption characteristics in the long-wavelength range are even further enhanced.

It will also be noted from the spectral characteristics shown in FIG. 9 that the reflectivity of the lamination in accordance with this embodiment starts to climb from a wavelength of around 20,000 angstroms. The main cause for this is that the In$_2$O$_3$ shield layer 14 and the ITO films in the vicinity of this layer have relatively low Sn contents so that they provide strong Drude reflection.

Also, as the electrical resistance of the lamination according to this embodiment is 4.86 Ω/sq., it is fully adequate for use as the heating element for a demister or defroster on a vehicle window.

It should be noted that although the shield layers 12 and 14 in this embodiment have been specified as being of greater thickness than the individual films constituting the shield layer 20, there is no need to limit the lamination to this arrangement and it is also possible for these shield layers to have the same thickness as the films.

Nor is the lamination limited to the arrangement of having the shield layer 20 formed of a number of laminated films as specified in this fourth embodiment. It is alternatively possible to utilize a single layer similar to the layer 12 of FIG. 2 but wherein Sn content of the shield layer 20 varies gradually in the direction of thickness, that ms to form it as a single ITO layer with a Sn content that varies continuously in the direction of thickness.

When shield layers are formed on a substrate under a relatively low level of vacuum, there is a possibility that the strength at the interfaces between the layers may become much less than the internal strength of the layers if the Sn content of adjacent layers should differ greatly. If, however, as in this fourth embodiment, the shield layer 20 is formed by laminating a plurality of ITO films each having a different Sn content, it is possible to keep the difference in tin content between neighboring layers (films) relatively small thus effectively preventing deterioration of the interfacial strength.

EXAMPLE 5

Figure 10:
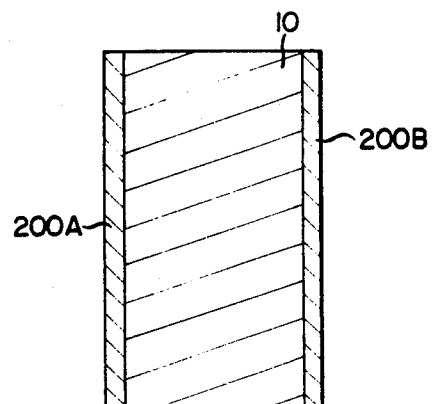
FIG. 10 is an explanatory view showing a fifth embodiment of this invention wherein both sides of a glass substrate are provided with laminations.

A fifth embodiment of the invention is shown in FIG. 10. In this embodiment, a glass substrate 10 is provided on both sides with laminations (200A, 200B) according to any of the first to fourth embodiments described above. Thus, when the arrangement of the present embodiment is used in conjunction with a vehicle window, for example, the laminations 200A, 200B on opposite sides of the glass substrate can be selectively employed as heating elements for demisting or defrosting. For example, fog tending to form on the inside surface of the window can be removed and/or prevented by passing electric current through the lamination 200A on the inside. On the other hand, any frost forming on the outside of the window can be melted by passing current through the outer lamination 200B. By such selective utilization of the two laminations, it is possible to effectively maintain visibility under various circumstances.

EXAMPLE 6

Figure 11:
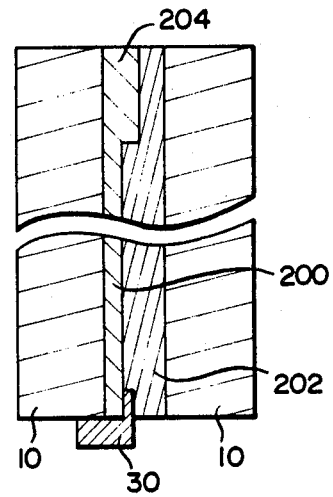
FIG. 11 is an explanatory view of a sixth embodiment of this invention wherein laminations are provided betwween the members of a laminated glass plate.

A sixth embodiment of the invention is shown in FIG. 11. In this embodiment a lamination 200 is used in conjunction with a laminated vehicle window.

The window according to this embodiment is formed by providing a lamination 200 on the inside surface of one of two glass substrates 10, applying a coating 202 of a transparent thermoplastic resin such as polybutylal on the inside of the other substrate 10 and then adhering the two substrates 10 together by the resin coating 202.

The lamination 200 of this embodiment is provided at a portion thereof covering between 1/10 and ¼ of the upper part of the substrates 10 with an auxiliary layer 204 formed of a plurality of high Sn content ITO layers. When laminated glass formed in this manner is used as a vehicle window it exhibits good antiglare effect as well as good heat wave shielding effect.

More specifically, when laminated glass of this type is used for a vehicle window, since the auxiliary layer 204 provided at the upper part of the lamination 200 contains much Sn, the transmittance of this part is somewhat reduced and its color becomes slightly bronze. As a result the portion of the window covered by the auxiliary layer 204 exhibits an antiglare effect with respect to external light effectively reducing the glare experienced by the driver when driving into the rising or setting sun. On the other hand, the auxiliary lamination also provides effective heat wave shielding against the rays of sunlight at midday, particularly against those rays striking almost vertically at around noon, and thus helps to prevent the temperature inside the vehicle from rising and to prevent heat waves from striking the driver's face. It is consequently highly effective toward maintaining a pleasant environment within the vehicle.

In a case where a lamination 200 according to one of these embodiments is to be used as a demister or defroster for an automobile window, it is necessary to provide the lamination 200 with electrodes through which electrical power can be supplied thereto from the automobile battery. The provision of these electrodes is particularly easy in this sixth embodiment since the auxiliary layer 204 consisting of high Sn content ITO that is provided along the top edge of the lamination 200 has excellent electrical conductivity and therefore can be employed as an electrode extending along the entire upper edge of the window simply by providing electrodes at one or no more than a few points on the auxiliary layer 204. Thus, if an appropriate number of electrodes 30 are provided along the lower edge of the glass opposing the auxiliary layer 204, electric current supplied from a power source will flow laterally through the auxiliary layer 204 and then pass from the auxiliary layer 204 through the lamination 200 to the electrodes 200 provided on the opposite edge and back to the power source.

In this embodiment, since the current passed through the lamination 200 is supplied by a car battery (about 12 volts), the electrical resistance of the lamination 200 must be taken into consideration. However, when the current is passed through the lamination 200 from top to bottom as in the present embodiment, it is possible to obtain a proper degree of heating for demisting or defrosting. What is more, because of the provision of the auxiliary layer 204 along the top edge of the window, the anti-fogging effect is particularly good at the upper portion of the glass thus assuring good visibility.

Another advantage of the present embodiment is that in producing the laminated glass it is possible to pass a large current through the lamination 200 to melt the transparent thermoplastic resin coating 202 to bond the two sheets of glass to one another effectively and uniformly.

EXAMPLE 7

Figure 12:
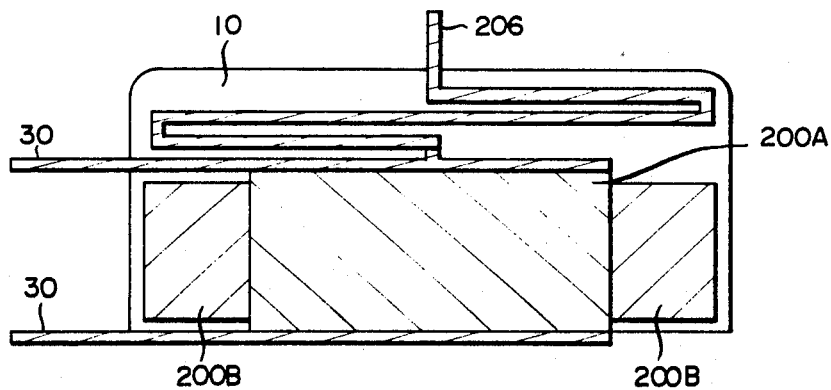

FIG. 12 shows a seventh embodiment of the heat wave shielding lamination according to this invention used in conjunction with a vehicle window. The window according to this embodiment is provided with a rectangular lamination 200A covering most of its central portion and two laminations 200B provided one each on the left and right of the lamination 200A. The lamination 200A at the center of the window is provided with heating electrodes 30 at the upper and lower edges thereof. The window of this structure shown in FIG. 12 thus exhibits good heat wave shielding effect with respect to sunlight and, moreover, the central lamination 200A thereof can be used as a demister or defroster heating element by passing electric current therethrough via the electrodes 30. As the lamination according to the present invention has excellent transmittance in the visible light range, it does not obstruct the driver's vision in the way that the conventional wire-type heating elements do. Moreover, as it functions as a planar heating element, it is able to provide uniform demisting or defrosting over all of the surface of the glass covered thereby.

The electrodes 30 provided on the lamination 200A can be formed as conventional silver or copper wire-type electrodes. Alternatively, they may be formed similarly to the auxiliary layer 204 in FIG. 11 or as thin ITO layers whose electrical conductivity has been increased through the addition of an increased amount of Sn.

Moreover, when the lower edge of the lamination 200A is made flush with the lower edge of the substrate 10 as shown in FIG. 12, its electrode 30 on the lower side can be formed in the window frame. In this case, the arrangement can be made such that when the glass substrate is fitted into the window frame, the lower edge of the lamination 200A automatically comes into contact with an electrode built into the frame beforehand. Further, the lamination 200A according to this invention can be made to function as an antenna simply by connecting the lead of the antenna 206 to one or the other of its electrodes 30.

EXAMPLE 8

Figure 13:
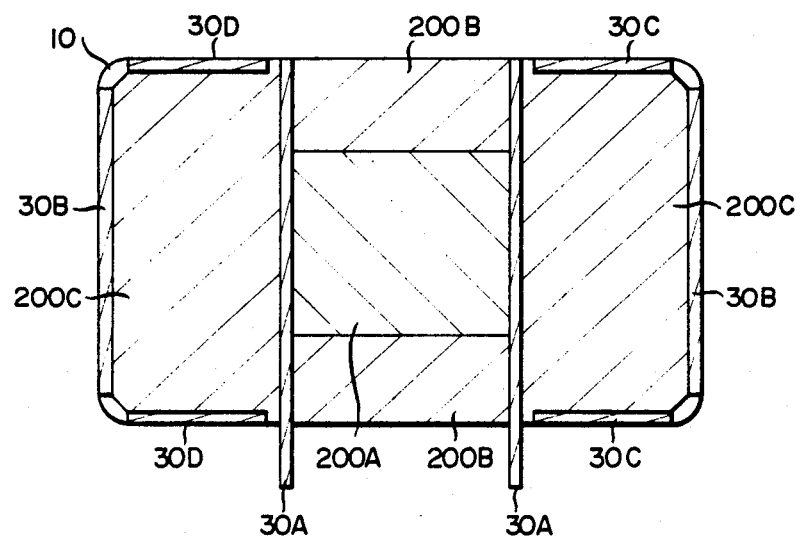

Another embodiment wherein the lamination according to this invention is used as a heating element is shown in FIG. 13. In this embodiment a plurality of laminations 200A, 200B and 200C, each having a different structure, are provided on the surface of a glass substrate 10 for use in an automobile. The laminations 200A, 200B and 200C are provided with a plurality of a heating electrodes 30A, 30B, 30C and 30D. Thus, by selecting a desired pair of the electrodes 30 for the passage of electrical current through the corresponding laminations 200A, 200B and 200C, it is possible to selectively activate any of the laminations 200 provided on the glass surface and thus to locally demist or defrost desired local areas of the glass.

In this arrangement, if the laminations 200A, 200B and 200C are made to have different numbers of layers, for example if the number of layers (and thickness) of the lamination 200A is made greater than that of the other laminations, the lamination with the greater number of layers will not only have stronger heat wave shielding characteristics, it will also have lower electrical resistance. Therefore, when, for example, a voltage is applied across the electrodes 30A, the current flow will concentrate in the lamination 200A because of its lower resistance and, as a result, it will become possible to carry out concentrated demisting or defrosting etc. in the area covered by the lamination 200A.

Also it will be noted in the arrangement shown in FIG. 13 the distance between a 30A electrode and a 30B electrode is shorter than the distance between two 30D alectrodes. Thus the resistance of the lamination 200C between the electrodes 30A, 30B is smaller than the resistance between the electrodes 30D. Therefore, in a case where one and the same voltage is to be applied across the lamination 200C in order to use it as a heating element, it is possible to control the amount of heat generated by the lamination 200C by selectively applying the voltage either across the electrodes 30A and 30B or across the electrodes 30D. As this type of control of the amount of heat generated by the laminations 200A, 200B and 200C can be carried out simply by the selection of electrodes, the control circuitry does not require any type of transformer or power control circuitry and consequently has the advantage of being extremely simple. Moreover, it is possible to carry out particularly efficient demisting, defrosting and the like by periodically switching from one set of electrodes to another so as to periodically switch among the laminations 200 and to periodically change the rate of heat generation.

Since the lamination 200A provided at the center of the glass has greater heat shielding and demisting/defrosting effect than the other laminations, the arrangement according to this embodiment is suitable not only for windshields but also for rear windows and detachable skylights.

EXAMPLE 9

Figure 14:
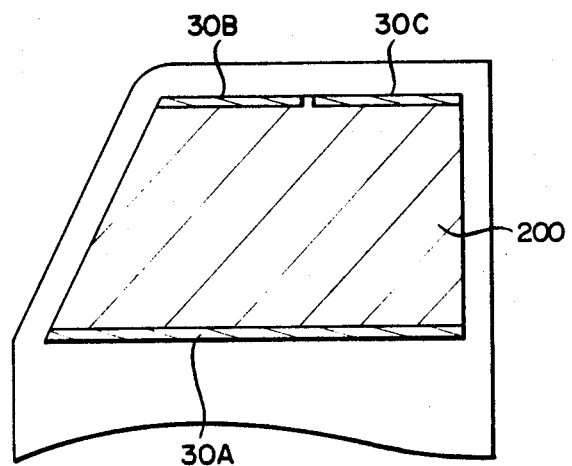
FIGS. 12–14 are explanatory views of seventh to ninth embodiments of this invention wherein heat wave shielding laminations according to this invention are provided on vehicle window panes.

A ninth embodiment of the heat wave shielding lamination according to this invention is shown in FIG. 14. In this embodiment the lamination is applied to the door window of an automobile. One electrode 30A is provided along the bottom of the window frame and two separate electrodes 30B and 30C are provided across the top thereof. The arrangement is such that when the window is closed an electrical circuit is established across a lamination 200 provided on the surface of the window glass. With this structure the lamination 200 is able to provide good shielding against solar heat waves and is also able to serve as a heating element which can be activated by passing electric current through a selected pair of electrodes so as to prevent misting and assure good visibility at all times. In particular, in using the lamination provided on the surface of the glass as a heating element, if, as in the present embodiment, two separate electrodes 30B, 30C are provided on one side, then by selecting one or the other of these electrodes in combination with the electrode 30A at the bottom it is possible to selectively heat a desired region of the lamination. For example, if the electrodes 30B and 30A are selected for the passage of current, the heating effect will be concentrated in the left half othe window, making it possible to demist or defrost this half rapidly. Thus, if current is first selectively passed across the electrodes 30A,30B, the left half of the window will be rapidly demisted or defrosted, whereafter current can then also be passed through the electrode 30C to obtain uniform demisting or defrosting over the full area of the window. The arrangement is thus highly effective in removing and preventing fog during the rainy season.

Although the structure employed in this embodiment permits the passage of current through the lamination 200 only when the window is closed, it is also possible to provide an arrangement which allows current passage even when the window is open by, for example, providing wire-type electrodes at the top edge of the lamination 200 and allowing these electrodes to make sliding contact with electrodes provided along the opposite sides of the window frame.

When the heat wave shielding lamination according to this invention is used in conjunction with vehicle window glass as in the embodiments shown in FIGS. 12–14, there is the additional advantage that the lamination acts as a shielding against electromagnetic waves and that it is effective in preventing the accumulation of static electric charge, so that it protects the car occupants and the car's electric circuitry against electromagnetic noise and sparking. It can also help prevent the adherence of dust. The effect of preventing accumulation of static charge is good even when, as described in connection with the third embodiment, the lamination is provided with an insulative coating such as the $SiO_2$ anti-reflection layer 16.

Further, since the lamination according to this invention is electrically conductive, it can be used together with a simple detection circuit to detect cracking of the window glass on which it is provided. In this case, moreover, it is possible to use an arrangement wherein the automobile brakes are automatically activated upon detection af a crack in the window and/or an arrangement wherein a burglar alarm is set off if cracking of the glass should be detected at a time when the car is parked, thus making a major contribution to driving safety and theft prevention.

In the practical utilization of the lamination according to this invention, it is also possible to take advantage of the lamination's electrical conductivity in various other ways without causing any adverse effect on its heat wave shielding properties. For example, the lamination can be made to function as a dew sensor by measuring the change in the electrical resistance of the lamination, particularly the change in the resistance of its outermost layer, caused by the formation of dew thereon. Then, by using the output signal from this dew sensor to control the amount of current passed through the lamination, it is possible to even further enhance the lamination's antifogging effect. Also, since it is possible to determine the temperature of the lamination from its electrical resistance, it is further possible to control the temperature of the lamination by controlling the amount of current passed therethrough on the basis of the detected temperature.

Again, it is possible to use the lamination according to this invention in combination with various other types of layers used as sensors, light shields, displays, etc. In such cases, it is preferable to use layers which undergo property changes when exposed to heat, electricity, light, etc. As such materials there can be mentioned liquid crystals (twisted nematic type, cholesteric type), electrochromic materials, thermochromic materials, photochromic materials, any of various temperature indicating paints, PLTZ and other broadly defined electrooptic materials, magnetooptic materials, acoustooptic materials, and other active and passive optical materials, particularly light-emitting devices and electroluminescent materials. As these materials to be used in combination with the lamination according to this invention exhibit anistropy in refractive index, absorption and reflectivity as well as in their polarization, rotary polarization, deflection and modulation properties, they can be used as required as various types of sensors or as light shield layers or display layers.

Although the foregoing description of the embodiments of the heat wave lamination according to this invention was made mainly with respect to examples wherein the lamination is used in conjunction with automobile window glass, the lamination is not limited to such applications and can be utilized for a wide range of other purposees as well. As the lamination according to this invention exhibits excellent transmittance to visible light, shielding against infrared radiation, electrical conductivity and mechanical strength, it is also able to manifest outstandingly good effects when used for the window glass of aircraft and ships, for coatings on spectacle lenses, camera lenses and other optical components, for window glass for homes, hospitals, laboratories, factories, shops and other structures, and for window glass for frozen food showcases and refrigerators. Moreover, since the heat wave shielding effect of the lamination according to this invention can be freely varied simply by making slight changes in the nature and thickness of its layers, it can be used to great advantage for the peepholes of ovens and furnaces, the windows of welding masks and in numerous other applications requiring strong shielding against heat waves without loss of transparency to visible light. It is also possible to apply the lamination according to this invention as a coating on the surface of a solar cell, in which case it can be used as an anti-reflection, transparent electrode to enhance the performance of the cell.

Although in the embodiments explained in the foregoing, the lamination according to this invention was described mainly as being used on the outside of a window glass, it is not limited to such applications and can also be used on the inside of the glass as required by the circumstances. In such cases, although there will be some decrease in the cooling effect of the surrounding air on the lamination heated by the absorption of heat waves, the fact that the lamination is located inside the room or passenger cabin will help to enhance its antifogging effect and service life.

Although in the embodiments described above, the additive to be included in the $In_2O_3$ shield layers was specified as Sn, the additive is not limited to Sn and may instead be another element which readily becomes a positive ion with a valence number of $+4$ or larger such as W, Mo, Ti, Zr or Pb or an element such as F which readily becomes a negative ion with a valence number of $-1$. Also, in place of including such an additive, it is possible to realize a similar effect by creating oxygen vacancies in the layers. This is because when oxygen vacancies are present, no other atom occupies the position in the crystal where the oxygen atom should normally be, giving rise to a phenomenon similar to that obtained by the inclusion of an additive.

Although in the above described embodiments, the shield layers were formed of $In_2O_3$, it is possible to form them of $SnO_2$ instead. In this case, the same effects as those described with respect to the embodiments explained in the foregoing can be realized by using as the additive an element which readily becomes a positive ion with a valence number of $+5$ or larger such as Sb, P, As, Nb, Ta, W or Mo or an element such as F which readily becomes a negative ion with a valence number of $-1$. Also, in place of including such an additive, it is possible to realize a similar effect by creating oxygen vacancies in the layers.

As explained in the foregoing, in the present invention a visible light transparent substrate is provided with an overlying lamination consisting of at least two $In_2O_3$ layers containing different amounts of Sn, the amount of Sn contained in the respective layers increasing with increasing proximity of the substrate, whereby the resulting heat wave shielding lamination has good transmittance for visible light and good shielding effect against rays in the infrared spectrum by virtue of the fact that the shield layers containing different amounts of Sn exhibit maximum infrared ray absorption at different wavelengths to give high infrared ray absorption over a wide wavelength range, and each shield layer absorbs the infrared rays reflected by Drude reflection from any shield layer containing more Sn than itself. Thus, by this invention it is possible to provide a vehicle window glass or any other substrate requiring transparency with a highly effective heat shielding lamination. Moreover, since in accordance with the present invention, the absorption with respect to heat waves is enhanced by the fact that heat waves once reflected from the layers of the lamination by Drude reflection are absorbed by any layer closer to the side of entry of the heat waves, it is possible to effectively prevent the occurrence of heat wave pollution due to the reflection of heat waves impinging on the lamination so that the lamination can be used in locations where the use of conventional shielding means would give rise to problems of heat wave pollution. Further, since the lamination in accordance with this invention has excellent mechanical strength and is also electrically conductive, its range of potential application is extremely broad.

We claim:

1. A heat wave shielding lamination comprising a visible light transparent substrate and an overlying lamination comprising two $In_2O_3$ shield layers containing different amounts of Sn, the amount of Sn increasing with increasing proximity to the substrate, whereby the resulting heat wave shielding lamination has good transmittance for visible light and good shielding effect against rays in the infrared spectrum by virtue of the fact that the shield layers containing different amounts of Sn manifest maximum infrared absorption at different wavelengths to give high infrared ray absorptioon over a wide wavelength range.

2. A heat wave shielding lamination according to claim 1, wherein the $In_2O_3$ shield layers contain different amounts of Sn within the range of 0–60 percent Sn atoms.

3. A heat wave shielding lamination according to claim 2, wherein the $In_2O_3$ shield layers contain different amounts of Sn within the range of 0–20 percent Sn atoms.

4. A heat wave shielding lamination according to claim 1, wherein the substrate is glass and the overlying lamination comprises a layer of ITO containing about 20 percent Sn atoms and a layer of $In_2O_3$.

5. A heat wave shielding lamination according to claim 1, wherein the shield layer which is nearest to said substrate is formed of a plurality of $In_2O_3$ films containing different amounts of Sn, the amount of Sn increasing with increasing proximity to said substrate.

6. A heat wave shielding lamination according to claim 5, wherein the substrate is glass and wherein there is further provided a topmost $In_2O_3$ shield layer.

7. A heat wave shielding lamination according to claim 1, wherein the shield layer which is nearest to said substrate is a single layer of $In_2O_3$ containing increasing amounts of Sn with increasing proximity to said substrate.

8. A heat wave shielding lamination according to claim 1 further comprising an anti-reflection layer on the surface of the lamination, thereby enhancing transparency to visible light.

9. A heat wave shielding lamination according to claim 8, wherein the anti-reflection layer consists of $SiO_2$.

10. A heat wave shielding lamination according to claim 1 further comprising an undercoating between said visible light transparent substrate and said overlying lamination, thereby enhancing transparency to visible light.

11. A heat wave shielding lamination according to claim 10, wherein the undercoating consists of $SiO_2$.

12. A heat wave shielding lamination according to claim 1, wherein said lamination constitutes a planar heating element when electrical heating current is applied thereto.

13. A heat wave shielding lamination according to claim 1, wherein the substrate is a vehicle window.

14. A heat wave shielding lamination according to claim 13, wherein the overlying lamination itself has an overlying plate of glass.

15. A heat wave shielding lamination according to claim 13, wherein the lamination is provided with electrodes which are connected to a source of heating current, whereby the lamination serves as a demister or defroster when heating current is passed therethrough.

16. A heat wave shielding lamination according to claim 15, wherein separate laminations are provided at a center portion and both side portions of the vehicle window and heating current is passed through the lamination at the center portion through electrodes provided at a top and bottom portion thereof.

17. A heat wave shielding lamination according to claim 15, wherein a plurality of overlying laminations having different structures are provided on the surface of said vehicle window and each lamination is provided with electrodes for supplying heating current thereto, whereby the laminations can be selectively heated by passing heating current through selected pairs of electrodes.

18. A heat wave shielding lamination according to claim 14, wherein a portion of the overlying lamination covering between about 1/10 and ¼ of an upper part of the vehicle window is formed of a plurality of ITO layers having an Sn content of up to 60%.

* * * * *